May 12, 1964 P. W. OTT 3,133,261
DEPTH FINDER OF A VEHICLE IN A FLUID
Filed Sept. 26, 1961 2 Sheets-Sheet 2

INVENTOR.
PERCY W. OTT
BY Erwin A. Johnston
George G. Rubens
ATTORNEYS

United States Patent Office 3,133,261
Patented May 12, 1964

3,133,261
DEPTH FINDER OF A VEHICLE IN A FLUID
Percy W. Ott, Oxnard, Calif., assignor to the United States of America as represented by the Secretary of the Navy
Filed Sept. 26, 1961, Ser. No. 140,958
8 Claims. (Cl. 340—5)
(Granted under Title 35, U.S. Code (1952), sec. 266)

The invention described herein may be manufactured and used by or for the Government of the United States of America for governmental purposes without the payment of any royalties thereon or therefor.

The present invention relates to a depth finder of a vehicle in a fluid and more particularly to a device for continuously transmitting to a distant point a measurement of the depth of a vehicle which is moving in a body of water.

In order to conduct research and development work on and testing of torpedoes and other underwater weapons it has been necessary to track these vehicles during their underwater runs. This type of tracking is usually done by means of underwater sound pulses emitted by the vehicle to be tracked and received by arrays of fixed hydrophones. Time differences between the emission of the pulses and their reception at the hydrophones are then employed as the basic data for computing the coordinates of the vehicles various positions. In such a method of measurements there will always be positional errors which are functions of the geometry of the hydrophone complexes as well as of the statistical errors in the basic measurements. The geometric exaggeration of the error in the vertical or depth coordinate is nearly always greater than in the horizontal coordinates. In order to reduce these errors to a specified minimum, it is often necessary to increase the number of hydrophones receiving signals so as to have redundant data with which to work out the position of the vehicle. The present invention reduces the errors in the above-described system by directly determining the vertical coordinate of an underwater vehicle whether it be moving or at rest, entirely independent of the timing of sound pulses or of the matching of phases of underwater sound signals. This is accomplished by transmitting from the underwater vehicle at least one sonic signal which is indicative of the pressure of the surrounding water, this pressure in turn indicating the depth at which the underwater vehicle is located. In a preferred embodiment of the invention two signals from the vehicle are transmitted in sequence, one of which is a signal which has a frequency governed by the ambient pressure surrounding the vehicle and the other signal of a fixed known frequency whereby upon reception of these signals at some underwater remote station the frequency of the governed or modulated signal will indicate the depth of the vehicle uncorrected for Doppler effect at a particular time and the received fixed frequency signal will indicate the Doppler effect due to the movement of the vehicle so that the frequency of the modulated signal can be interpreted to determine the exact depth of the vehicle within the water. In a further embodiment, a single signal of a known frequency is transmitted from the vehicle to the remote station for particular intervals of time, the time of these intervals being governed by the ambient pressure surroundng the vehicle. The received frequency will then give an indication of the Doppler effect due to the movement of the vehicle and this can be applied to correct the time intervals in order to determine the depth of the vehicle within the water. Having known the depth of the vehicle, the problem of solving the exact position of the body by an array of fixed hydrophones is materially facilitated, thus enabling a specified accuracy to be obtained with a smaller number of hydrophones.

An object of the present invention is to provide a device which will enable an accurate determination of the vertical position of an object moving within a fluid to be made.

A further object is to provide a device which will increase the accuracy and reduce the cost of a system for tracking an object moving within a fluid.

Other objects and many of the attendant advantages of this invention will be readily appreciated as the same become better understood by reference to the following detailed description when considered in connection with the accompanying drawings in which reference numerals designate like parts throughout the figures thereof and wherein.

Figure 1:
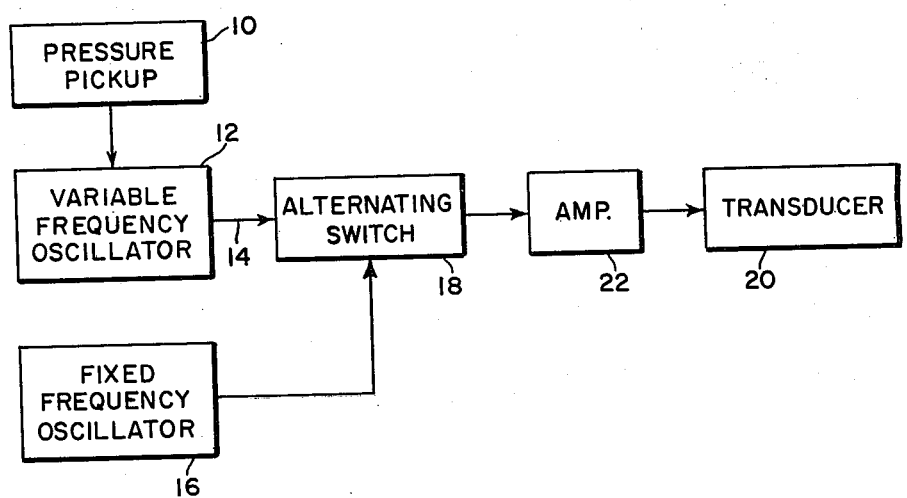
FIG. 1 is a diagrammatic view of a preferred embodiment of the invention.

Referring now to the drawings, wherein like reference numerals designate like or corresponding parts throughout the several views, there is shown in FIG. 1 an electrical arrangement which is to be mounted in an object such as a vehicle (not shown) which is to travel in a fluid such as water (not shown). The arrangement includes a pressure pickup 10 having an output which controls the frequency of a variable frequency oscillator 12, the pressure pickup being responsive to the pressure of the fluid surrounding the vehicle so as to cause the variable frequency oscillator 12 to have an output, through a lead 14, which has a frequency corresponding to the pressure about the vehicle. The output signal from the variable frequency oscillator 12 and an output signal from a fixed frequency oscillator 16 are each fed to an alternating switch 18, this switch having an output which is alternately the output of the variable frequency oscillator 12 and the output signal of the fixed frequency oscillator 16. The output of the alternating switch 18 is then fed to a transducer 20 via an amplifier 22, the transducer being capable of transmitting amplified output signals of the variable frequency oscillator 12 and the fixed frequency oscillator 16 to some remote receiving station (not shown) located within the water.

Figure 2:
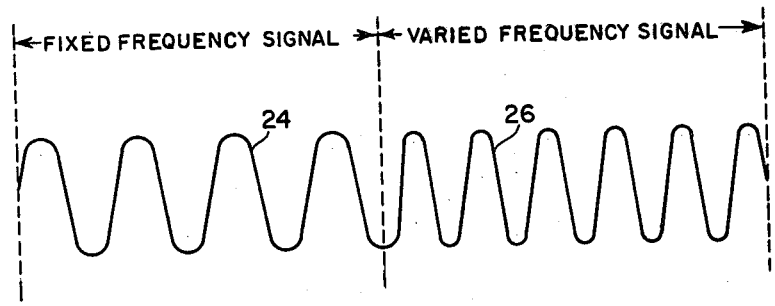
FIG. 2 illustrates the two signals transmitted from the preferred embodiment.

FIG. 2 illustrates the signals transmitted by the transducer 20 which are a fixed frequency signal 24 (the amplified output signal of the fixed frequency oscillator 16) and a controlled frequency signal 26 (the amplified output signal of the variable frequency oscillator 12). The output signal of the variable frequency oscillator 12 is calibrated according to various pressures so that the signal will give an indication of the depth of the object within the water when received by the remote station. In order to correct for the Doppler shift of the received signal of the variable frequency oscillator 12 the fixed frequency oscillator 16 is employed with a known frequency so that when the output signal of the fixed frequency oscillator 16 is picked up by the remote station the Doppler shift between this known frequency and the frequency received can be applied as a correction factor to the frequency of the received signal of the variable frequency oscillator 12. Accordingly, in the operation of the preferred embodiment of the invention the transducer transmits alternately the fixed frequency signal 24 and the varied frequency signal 26, these signals being received nearly simultaneously by the remote station. The received varied frequency signal 26 is an indication of the depth of the object within the water uncorrected for Doppler effect when the object is moving therein and upon applying the Doppler shift correction factor thereto the frequency of the signal of the variable frequency oscillator as transmitted from the vehicle is found, which frequency is correlated with a depth to solve the problem.

Figure 3:
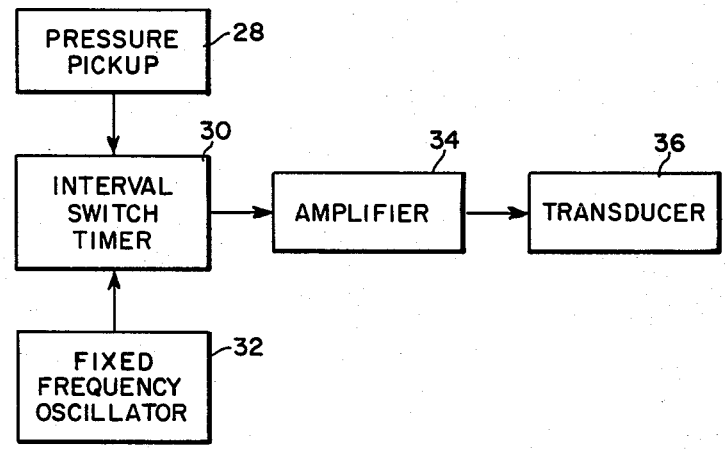
FIG. 3 is a diagrammatic view of another embodiment of the invention.

FIG. 3 illustrates another embodiment of the invention wherein there is shown a pressure pickup 28 which is responsive to the ambient pressure surrounding the object the same as the pressure pickup 10 in the other embodiment. The pressure pickup 28 has an output which governs an interval switch timer 30 so as to cause the timer 30 to have switching intervals of time correlated with the pressure of the fluid surrounding the vehicle so that, knowing the interval, the pressure can be determined. A fixed frequency oscillator 32 has an output signal of a known frequency which is fed to an amplifier 34 via the interval switch timer 30 so that the interval of the output signal of the fixed frequency oscillator 32 is governed by the interval switch timer 30. The output of the amplifier 34 is fed to a transducer 36 which in turn transmits the timed output signal of the fixed frequency oscillator 32 to the remote station.

Figure 4:
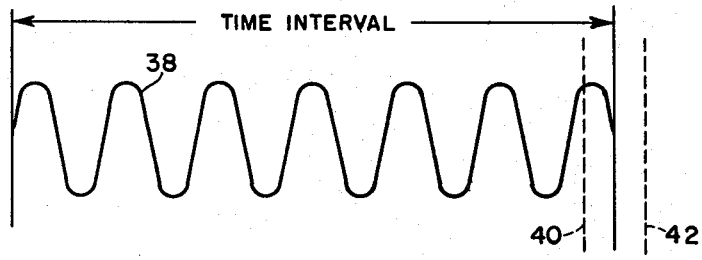
FIG. 4 illustrates the signals transmitted from the embodiment shown in FIG. 3.

FIG. 4 illustrates a signal 38 which is received from the transducer 36 for the interval of time, this interval upon receipt of the signal by the remote station giving an indication of the depth of the vehicle when moving within the water uncorrected for Doppler effect. With the frequency of the output signal of the fixed frequency oscillator 32 known, the frequency of the signal received by the remote station can be compared with the known frequency to determine the Doppler shift of the received signal due to the movement of the vehicle within the water. With the sound frequency shift this can be applied as a correction factor to the interval of time of the received signal to either reduce the time as shown by dotted line 40 or increase the time as shown by dotted line 42 depending upon whether the vehicle is moving away from or toward the remote station. The corrected time interval is then proportioned to the depth of the water so as to give the answer to the problem.

It is to be understood that the mechanical structures and electrical circuitry may take many various forms as, for example, the pressure pickup 10 may be a bellows arrangement responsive to pressure having an actuating rod for varying the inductance of a coil within the variable frequency oscillator 12 so as to change the frequency of that oscillator. The same arrangement could be applied to the embodiment shown in FIG. 3 with the pressure pickup 28 varying the switching interval of the interval switch timer 30 in a like manner. Further, the alternating switch 18 in the embodiment shown in FIG. 1 is not absolutely necessary since both of the output signals from the variable frequency oscillator 12 and the fixed frequency oscillator 16 can be simultaneously transmitted through either a single or double transducer to a remote station and the remote station can have two receivers tuned to separate frequencies so as to receive both of these output signals at the same time.

It is now readily apparent that the present invention provides a device which will greatly simplify the tracking of a vehicle moving within a fluid. The device enables the determination of the vertical coordinate of the vehicle so as to make it possible to track it with fewer hydrophones within an array and still keep the same efficiency. Conversely, if an equal number of hydrophones are maintained within an array by employing the device in conjunction therewith, the accuracy of the entire system is materially increased.

Obviously many modifications and variations of the present invention are possible in the light of the above teachings. It is therefore to be understood, that within the scope of the appended claims, the invention may be practiced otherwise than as specifically described.

I claim:

1. A device to be used in a system for tracking the elevation of an object carrying said device and moving with respect to the earth's surface in a fluid which has known pressures for various elevations wherein said system includes a receiving station having means for determining the frequency of signals received, said device comprising means for generating a pressure-responsive indication having a characteristic which is representative of the pressure of the fluid at the elevation of the object, means for generating a known frequency signal, and means for transmitting signal data in sonic form which includes the fixed frequency signal and the generated pressure-responsive indication whereby upon reception of the transmitted data by some remote receiving station the elevation of the object within the fluid can be determined by first comparing the frequency of the data received with the frequency of the known frequency signal to determine any frequency shift due to Doppler effect and then applying the frequency shift as a correction factor to the data received to find the pressure responsive indication, the pressure responsive indication being corresponded with the sought for elevation.

2. A device for use in a system for tracking the elevation of an object carrying said device and moving with respect to the earth's surface in a fluid which has known pressures for various elevations wherein said system includes a receiving station having means for determining the frequency of signals received, said device comprising means for generating a sonic frequency signal in said fluid, means for changing the frequency of said sonic signal proportional to the fluid pressure at the various elevations of said object and means for generating another sonic signal in said fluid of a known fixed frequency from the object whereby upon transmitting the signals to some remote receiving station within the fluid the elevation can be determined by comparing the frequency of the known fixed frequency signal with the frequency of the fixed frequency signal received to give any frequency shift due to Doppler effect and then applying the frequency shift as a correction factor to the frequency of the pressure responsive signal received, the corrected pressure responsive signal being correlated with the sought for elevation.

3. A device as claimed in claim 2 including means for alternately switching the signals to be transmitted between the pressure responsive signal and the known fixed frequency signal.

4. A device as claimed in claim 2 wherein the means for generating the pressure responsive signal is a variable frequency oscillator operated by a device directly responsive to the pressure of the fluid surrounding the object and the means for generating a known fixed frequency signal is a fixed frequency oscillator.

5. In a system including a receiving station having means for determining the frequency of signals received, a device capable of being attached to a water borne vehicle for enabling the depth of the vehicle within the water to be determined by the pressure of the water surrounding the vehicle, said device comprising a pressure sensing device, a variable frequency oscillator responsive to the pressure sensing device, the pressure sensing device being capable of sensing the pressure of the water surrounding the vehicle so that the variable frequency oscillator will have an output indicating said pressure, a fixed frequency oscillator having a signal output of a known frequency, means responsive to both oscillators for alternatively switching between the signal outputs of said oscillators and means responsive to the switching means for transmitting the switched signals in sonic form whereby upon transmitting the signals to some remote receiving station within the fluid the elevation can be determined by comparing the frequency of the known fixed frequency signal with the frequency of the fixed frequency signal received to give any frequency shift due to Doppler effect and then applying the frequency shift as a correction factor to the frequency of the pressure responsive signal received, the corrected pressure responsive signal being corresponded with the sought for elevation.

6. A device for use in a system for tracking the elevation of a moving object with respect to the earth's surface in a fluid which has known pressures for various elevations therein wherein said system includes a receiving station having means for determining the frequency of signals received, said device comprising means for generating a known fixed frequency signal from the object, means responsive to the pressure of the fluid surrounding the object for varying the time interval of the fixed frequency signal according to said pressure and means for transmitting the signal in sonic form to some remote receiving station whereby upon reception of the signal by the remote station the elevation can be determined by comparing the received frequency of the signal with the known frequency thereof to give any frequency shift due to Doppler effect and then applying the frequency shift as a correction factor to the received time interval of the signal, the corrected received time interval then being corresponded with the sought for elevation.

7. A device for use in a system for tracking the depth of a vehicle moving within a body of water which has known pressures for various depths therein wherein said system includes a receiving station having a means for determining the frequency of signals received, said device comprising a fixed frequency oscillator for generating a known frequency signal output, an interval switch timer receiving the known frequency signal for switching the signal to form various time intervals thereof, means capable of being exposed to the pressure of the water surrounding the object for governing the timing interval of the interval switch timer according to the pressure of the water and means for transmitting to some remote receiving station the fixed frequency signal in sonic form after its time interval has been formed by the timer whereby upon reception of the signal by the remote station the depth can be determined by comparing the received frequency of the signal with the known frequency thereof to give any frequency shift due to Doppler effect and then applying the frequency shift as a correction factor to the received time interval of the signal, the corrected received time interval then being corresponded with the sought for depth.

8. A method for enabling the tracking of the elevation of an object with respect to the earth's surface in a fluid which has known pressures for various elevations wherein the method is to be employed in conjunction with a system including a receiving station having means for determining the frequency of signals received, said method comprising the steps of generating a pressure-responsive indication having a characteristic which is a known function of the pressure of the fluid at the elevation of the object, generating a known frequency signal at the object and transmitting signal data in sonic form from the object which includes the fixed frequency signal and the generated pressure-responsive indication whereby upon reception of the transmitted data by some remote receiving station the elevation of the object within the fluid can be determined by first comparing the frequency of the data received with the frequency of the known frequency signal to determine any frequency shift due to Doppler effect and then applying the frequency shift as a correction factor to the data received to find the pressure responsive indication, the pressure responsive indication being corresponded with the sought for elevation.

References Cited in the file of this patent
UNITED STATES PATENTS

| | | |
|---|---|---|
| 2,323,317 | Dunmore et al. | July 6, 1943 |
| 2,375,421 | Lear | May 8, 1945 |
| 2,690,556 | Marshall | Sept. 28, 1954 |
| 2,871,459 | Berry | Jan. 27, 1962 |
| 3,038,143 | Dow | June 5, 1962 |

FOREIGN PATENTS

| | | |
|---|---|---|
| 435,621 | Great Britain | Sept. 20, 1935 |